C. A. PARSONS, S. S. COOK AND L. M. DOUGLAS.
GEARED TURBINE SYSTEM.
APPLICATION FILED SEPT. 4, 1920.
1,393,393.
Patented Oct. 11, 1921.
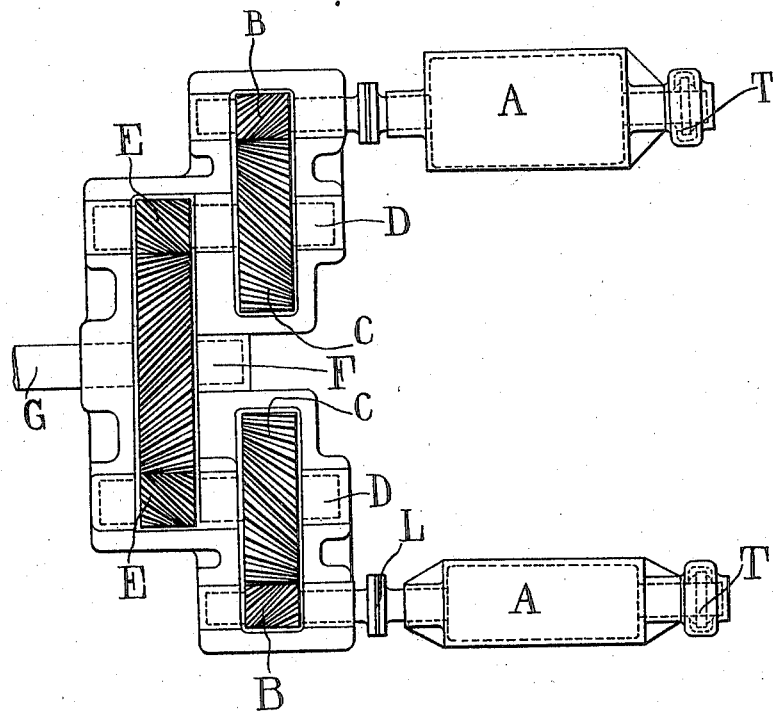
INVENTORS:
STANLEY S. COOK,
LOUIS M. DOUGLAS,
CHARLES A. PARSONS.
By Spear, Middleton, Donaldson & Hall.
Attys.

UNITED STATES PATENT OFFICE.

CHARLES ALGERNON PARSONS, STANLEY SMITH COOK, AND LOUIS MORTIMER DOUGLAS, OF NEWCASTLE-UPON-TYNE, ENGLAND; SAID COOK AND SAID DOUGLAS ASSIGNORS TO SAID PARSONS.

GEARED TURBINE SYSTEM.

1,393,393.  Specification of Letters Patent.  Patented Oct. 11, 1921.

Application filed September 4, 1920. Serial No. 408,276.

*To all whom it may concern:*

Be it known that we, CHARLES ALGERNON PARSONS, STANLEY SMITH COOK, and LOUIS MORTIMER DOUGLAS, all subjects of the King of Great Britain, residents of Heaton Works, Newcastle-upon-Tyne, in the county of Northumberland, England, have invented certain new and useful Improvements in Geared Turbine Systems, of which the following is a specification.

The present invention relates to geared turbine systems in which one or more turbines transmit power through helical gear trains.

It has already been proposed in specification Serial No. 260552 filed October 31st, 1918, that the steam thrust of a turbine or turbines shall be carried by double helical gears which the turbine operates. In many cases, however, it is necessary to provide balancing pistons in the turbine in order to reduce the steam thrust to such an amount as can be carried by the gears.

It has also been proposed to construct a geared turbine installation in which the turbine drives through single reduction gearing, part of the steam thrust being taken up by the gears and part by a pivoted thrust block which controls the longitudinal position of the turbine rotor.

The object of the present invention is to construct the installation in such a manner that the necessity for balancing pistons is avoided.

The invention consists in a double reduction geared turbine installation in which the steam thrust of the turbine is partly taken up by a single helical pinion engaging with a single helical wheel and partly by a thrust block, the end thrust of the intermediate shaft being taken up by inclining the teeth of the primary gear wheel and secondary pinion respectively at different angles.

The invention further consists in the improved geared turbine installation hereinafter described.

The invention is illustrated by way of example in the accompanying drawings, in which the turbines A, A, which are shown as high pressure and low pressure turbines respectively, are rigidly coupled to the pinions B, B. The pinions B are single helical and the longitudinal components of the tooth pressures are arranged to balance wholly or partly the steam pressures, excess of end thrust being taken by the thrust blocks T, T, which are advantageously of the pivoted type. The pinions B, mesh with wheels C on the intermediate shafts D, and it will be seen that the forces on the teeth of the wheel C will produce an axial thrust on the intermediate shaft D. On the shafts D are secondary pinions E which mesh with a secondary wheel F mounted on the propeller shaft G. The difference between the thrust of the secondary pinion E and the primary wheel C is carried by making the angle between the teeth of the former and the shaft smaller than in the case of the latter, the difference between these angles being chosen such that while a greater tangential force on the teeth of the pinion E is obtained than that on the teeth of the wheel C, the longitudinal component of the two pressures is the same for E as for C. In this condition the longitudinal thrust of the pinion E may be made to balance that of the wheel C and the thrust block on the intermediate shaft may be made of smaller dimensions or omitted altogether and the position of the shaft controlled by the bearing shoulders.

Astern turbines may be incorporated in any or all of the ahead turbine casings or separate astern turbines may be provided, and, if desired, these may drive their own pinions.

When the direction of rotation of a pinion is reversed, the axial components of the forces on the gear teeth are also reversed, and it is therefore necessary, in order to obtain approximately uniform distribution of pressure along the gear teeth, to have the direction of steam thrust on the astern turbines opposite to that of the ahead turbines.

In any of the foregoing arrangements, for convenience of adjustment a pad L may be provided between the coupling flanges of the pinions B and the rotor shafts.

Balance weights also may be provided on the intermediate shafts so arranged that tilting of the intermediate shafts is avoided when under varying loads, the forces acting in the upward direction become equal to the weight of the shaft, as described in the specification Serial No. 199341.

Having now described our invention, what we claim as new and desire to secure by Letters Patent is:—

In a double reduction geared turbine installation the combination of a turbine, a single helical pinion driven thereby, a single helical wheel engaged by the said pinion and partly taking up the steam thrust of the turbine, a thrust block also partly taking up said steam thrust, a main driving shaft, an intermediate shaft carrying said single helical wheel, a secondary pinion and gear of the single helical type connecting the intermediate shaft with the main driving shaft, the teeth of the primary gear wheel and secondary pinion respectively being inclined at different angles.

In testimony whereof we have signed our names to this specification.

CHARLES ALGERNON PARSONS.
STANLEY SMITH COOK.
LOUIS MORTIMER DOUGLAS.